US008882323B2

(12) United States Patent
Solomon et al.

(10) Patent No.: US 8,882,323 B2
(45) Date of Patent: Nov. 11, 2014

(54) LIGHTGUIDE

(75) Inventors: Jeffrey L. Solomon, Vadnais Heights, MN (US); Brian A. Kinder, Woodbury, MN (US); Gary T. Boyd, Woodbury, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 257 days.

(21) Appl. No.: 13/389,713

(22) PCT Filed: Aug. 11, 2010

(86) PCT No.: PCT/US2010/045115
§ 371 (c)(1),
(2), (4) Date: Feb. 9, 2012

(87) PCT Pub. No.: WO2011/019785
PCT Pub. Date: Feb. 17, 2011

(65) Prior Publication Data
US 2012/0140518 A1    Jun. 7, 2012

Related U.S. Application Data

(60) Provisional application No. 61/233,226, filed on Aug. 12, 2009.

(51) Int. Cl.
*G02B 6/00* (2006.01)
*F21V 8/00* (2006.01)

(52) U.S. Cl.
CPC ............ *G02B 6/0036* (2013.01); *G02B 6/0061* (2013.01); *G02B 6/0016* (2013.01); *G02B 6/0046* (2013.01); *G02B 6/0088* (2013.01)
USPC .............................. 362/619; 362/621; 362/628

(58) Field of Classification Search
USPC ......... 362/608, 617, 618, 620, 621, 623, 625, 362/626, 628
See application file for complete search history.

(56) References Cited

U.S. PATENT DOCUMENTS 6,700,634 B2   3/2004   Taniguchi et al.
7,188,989 B2   3/2007   Miyashita
(Continued)

FOREIGN PATENT DOCUMENTS

JP     H0553111 A      3/1993
JP     H07-261029 A   10/1995
(Continued)

OTHER PUBLICATIONS

PCT International Search Report from PCT/US2010/045115 mailed Nov. 16, 2010, 4 pages.

*Primary Examiner* — Laura Tso
(74) *Attorney, Agent, or Firm* — Daniel J. Iden

(57) ABSTRACT

Flexible unitary lightguide and a method of making the same are disclosed. The lightguide includes a structured input side that includes a first pattern having smaller features superimposed on a second pattern having larger features. The lightguide further includes a structured top surface that includes a first region and a different second region. The first region includes a plurality of discrete light extractors for extracting light that propagates within the flexible unitary lightguide by total internal reflection. The second region includes a taper portion for directing light from the structured input side to the first region. The light extractors form a periodic array that has a first period along the length of the flexible unitary lightguide. The first period is such that substantially no visible moir fringes occur when the flexible unitary lightguide is used as a backlight in a pixelated display.

27 Claims, 10 Drawing Sheets

(56) References Cited

U.S. PATENT DOCUMENTS

| | | |
|---|---|---|
| 7,357,557 B2 | 4/2008 | Miyashita |
| 2002/0012248 A1 | 1/2002 | Campbell et al. |
| 2003/0090887 A1* | 5/2003 | Igarashi et al. ............... 362/31 |
| 2005/0174803 A1 | 8/2005 | Hayashi et al. |
| 2005/0180166 A1 | 8/2005 | Hara et al. |
| 2007/0144315 A1 | 6/2007 | Gardiner et al. |
| 2007/0201234 A1 | 8/2007 | Ottermann |
| 2011/0228559 A1* | 9/2011 | Kinder ........................ 362/608 |

FOREIGN PATENT DOCUMENTS

| | | |
|---|---|---|
| JP | 2005285586 A | 10/2005 |
| WO | WO 2009/073470 | 6/2009 |

\* cited by examiner

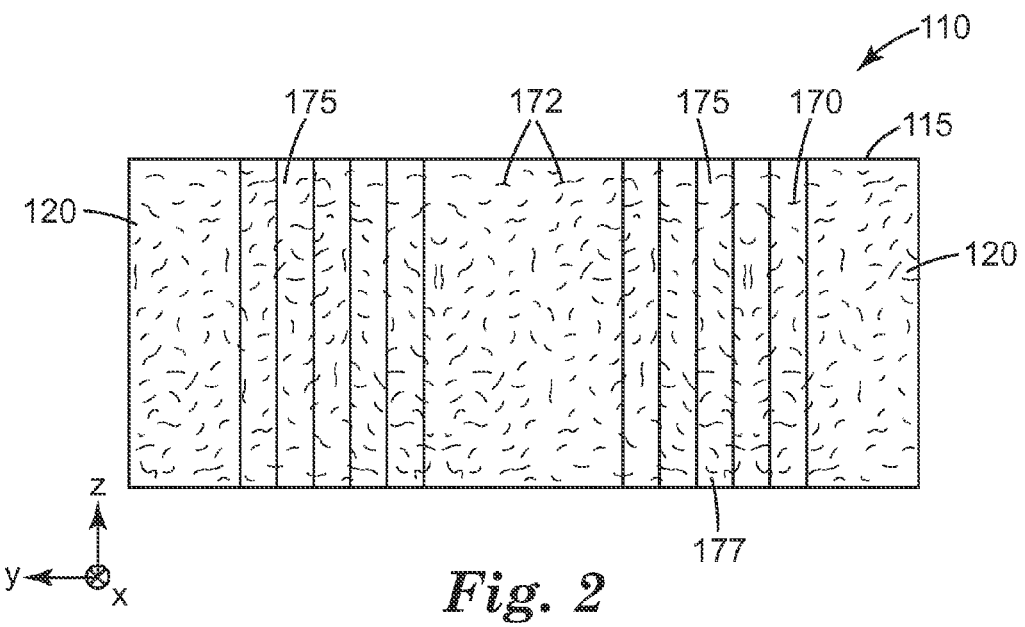
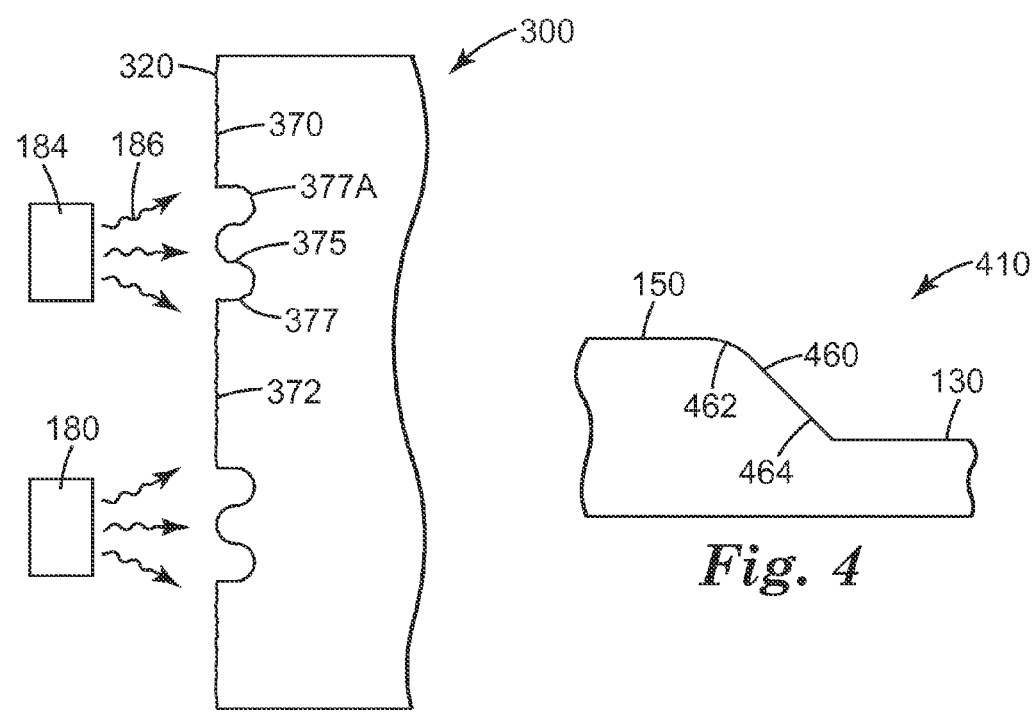

LIGHTGUIDE

CROSS REFERENCE TO RELATED APPLICATIONS

This application is a national stage filing under 35 U.S.C. 371 of PCT/US2010/045115, filed on Aug. 11, 2010, which claims priority to U.S. Provisional Application No. 61/233,226, filed on Aug. 12, 2009, the disclosure of which is incorporated by reference in its/their entirety herein.

FIELD OF THE INVENTION

This invention generally relates to lightguides. The invention is further applicable to optical systems, such as display and general lighting systems, incorporating such lightguides.

BACKGROUND

Displays, such as liquid crystal displays, often include an image forming panel and a backlight for illuminating the panel. Some backlights, often referred to as edge-lit backlights, include one or more light sources disposed along an outer border of the backlight and outside the light emitting area of the backlight.

SUMMARY

Generally, the present invention relates to lightguides and methods of making such lightguides. In one embodiment, a flexible unitary lightguide includes a structured input side that includes a first pattern having smaller features superimposed on a second pattern having larger features. The flexible unitary lightguide also includes a structured top surface that includes a first region that includes a plurality of discrete light extractors for extracting light that propagates within the flexible unitary lightguide by total internal reflection, and a second region that includes a taper portion for directing light from the structured input side to the first region. The light extractors form a periodic array that has a first period along a length of the flexible unitary lightguide. The first period is such that substantially no visible moiré fringes occur when the flexible unitary lightguide is used as a backlight in a pixelated display. The plurality of discrete light extractors includes a plurality of protrusions and/or depressions. In some cases, the size of the base of the extractors in the plurality of discrete light extractors is less than about 200 microns along the length of the lightguide and less than about 150 microns along the width of the lightguide, or less than about 120 microns along the length of the lightguide and less than about 100 microns along the width of the lightguide. In some cases, the height of the extractors in the plurality of discrete light extractors is less than about 100 microns, or less than about 60 microns, or less than about 40 microns, or less than about 20 microns. In some cases, the first period is in a range from about 10 microns to about 1000 microns, or from about 10 microns to about 100 microns. In some cases, the size of a discrete light extractor closer to the structured input side is smaller than the size of a discrete light extractor farther from the structured input side. In some cases, each discrete light extractor is a portion of the same three-dimensional body, where, in some cases, the three-dimensional body can be one of a sphere, a spheroid, an ovoid, and an ellipsoid. In some cases, no visible moiré fringes occur when the flexible unitary lightguide is used as a backlight in a pixelated display that includes a pixelated liquid crystal panel. In some cases, the first pattern is an irregular pattern and the second pattern is a regular pattern. In some cases, the average size of the features in the first pattern is less than about 30 microns. In some cases, the average size of the features in the second pattern is less than about 200 microns. In some cases, the second pattern includes a wave-like pattern. In some cases, the taper angle of the taper portion is in a range from about 1 degree to about 10 degrees. In some cases, the taper portion includes a linear taper. In some cases, the second region includes a plateau portion that is disposed between the structured input side and the taper portion. In some cases, a backlight includes the flexible unitary lightguide of claim 1, and one or more lamps that are disposed proximate the structured input side of the flexible unitary lightguide. In some cases, the one or more lamps define one or more light incidence regions on the structured input side, where the second pattern covers a first portion of the structured input side that is disposed inside the one or more incidence regions, but not a second portion of the structured input side that is disposed outside the one or more incidence regions.

In another embodiment, a flexible unitary lightguide includes a structured input side that includes a first pattern having smaller features superimposed on a second pattern having larger features. The flexible unitary lightguide also includes a structured top surface that includes a first region that includes a plurality of discrete light extractors for extracting light that propagates within the flexible unitary lightguide by total internal reflection, where each discrete light extractor is a portion of the same three-dimensional body. The structured top surface also includes a second region that includes a taper portion that tapers thinner toward the first region. The size of a discrete light extractor that is closer to the structured input side is smaller than the size of a discrete light extractor that is farther from the structured input side. In some cases, the light extractors in the plurality of discrete light extractors form a periodic array that has a first period along the length of the flexible unitary lightguide, where the first period is such that substantially no visible moiré fringes occur when the flexible unitary lightguide is used as a backlight in a pixelated display. In some cases, the three-dimensional body is one of a sphere, a spheroid, an ovoid, and an ellipsoid.

In another embodiment, a method of fabricating a lightguide includes the steps of: (a) providing a first tool; and (b) forming a patterned first tool by: (i) patterning a first region of the first tool using a first patterning method to form a first patterned region; and (ii) patterning a second region of the first tool, different than the first region of the first tool, using a second patterning method that is different than the first patterning method to form a second patterned region. The method of fabricating a lightguide further includes the steps of: (c) replicating the patterned first tool into a lightguide material to form a lightguide that includes a first replicated region that corresponds to the first patterned region of the patterned first tool and a second replicated region that corresponds to the second patterned region of the patterned first tool; and (d) cutting the lightguide to form a structured input side that includes a first pattern having smaller features superimposed on a second pattern comprising larger features. In some cases, the first patterning method includes an engraving method and the second patterning method includes a thread cutting method. In some cases, the lightguide material is a liquid. In some cases, the temperature of the lightguide material is greater than a glass transition temperature of the lightguide material. In some cases, the lightguide material is molten. In some cases, the lightguide material physically contacts the outermost surface of the patterned first tool. In some cases, the step of replicating the patterned first tool into a lightguide material includes disposing the lightguide material in between the first tool and a second tool. In some cases, the lightguide material physically contacts the outermost surface of the second tool. In some cases, the second tool includes a smooth outermost surface resulting in the lightguide having a smooth bottom surface. In some cases, the second tool includes a structured outermost surface resulting in the lightguide having a structured bottom surface, where the structured bottom surface of the lightguide can prevent wet out. In some cases, the step of cutting the lightguide includes cutting the lightguide by a die cutting or a laser cutting method.

BRIEF DESCRIPTION OF DRAWINGS

The invention may be more completely understood and appreciated in consideration of the following detailed description of various embodiments of the invention in connection with the accompanying drawings, in which:

FIG. 2 is a schematic view of structured input side of a lightguide;

FIG. 3 is a schematic top-view of a portion of another light source;

FIG. 4 is a schematic side-view of a portion of a lightguide;

In the specification, a same reference numeral used in multiple figures refers to the same or similar elements having the same or similar properties and functionalities.

DETAILED DESCRIPTION

This invention generally relates to lightguides that are unitary and include a tapered region for coupling light from a light source into the lightguide and another region for extracting light out of the lightguide. Some of the attributes of the exemplary light sources and lightguides disclosed herein are described in U.S. Patent Application Publication No. 2007/0279935, filed May 31, 2006; U.S. Patent Application Publication No. 2008/0232135, filed Nov. 30, 2007; U.S. Application Ser. No. 61/117,389, filed Nov. 24, 2008; and U.S. Application Ser. No. 61/117,376, filed Nov. 24, 2008; all of which are incorporated in their entireties herein by reference.

Figure 1A:
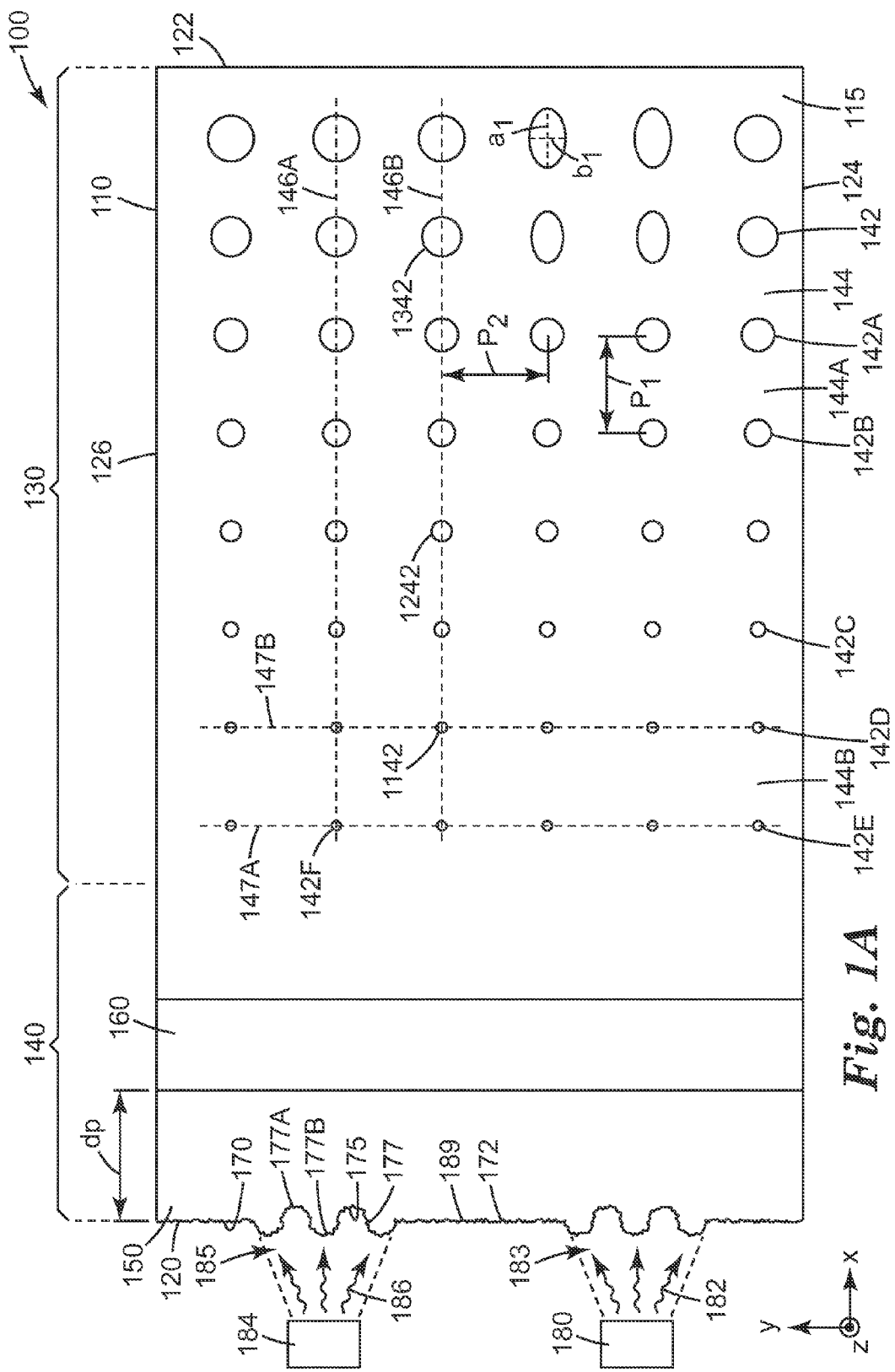
FIGS. 1A and 1B are respective schematic top- and side-views of a light source.
Figure 1B:
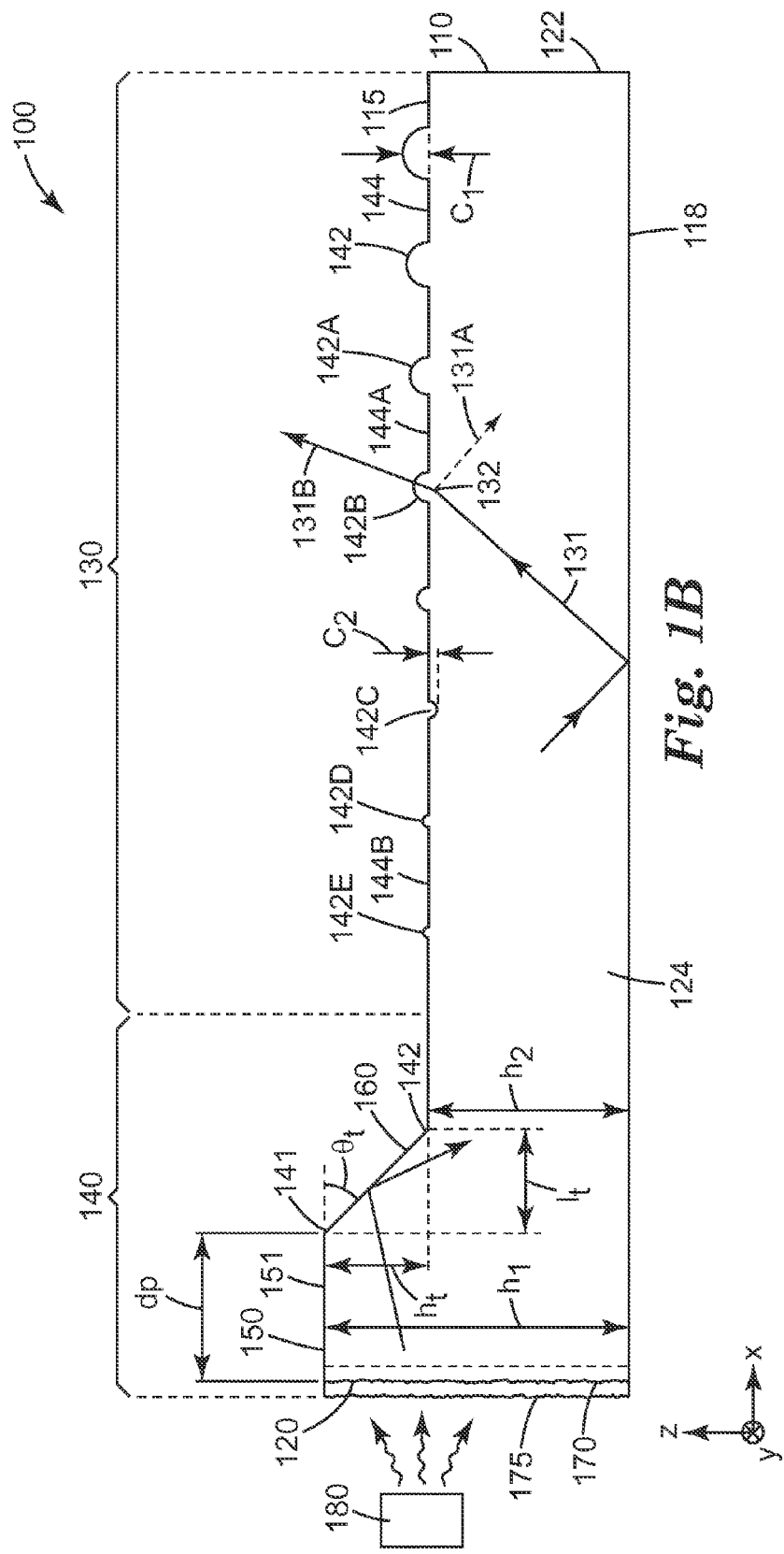

FIGS. 1A and 1B are respective schematic top- and side-views of a light source 100 that includes a flexible unitary lightguide 110, a first lamp 180 emitting light 182, and a second lamp 184 emitting light 186. The first and second lamps are disposed along a structured input side 120 of flexible unitary lightguide 110. Lightguide 110 includes a structured top surface 115, a bottom surface 118, structured input side 120, second or distal side 122, third side 124 and fourth side 126. FIG. 2 is a schematic view of structured input side 120 of lightguide 110.

Lightguide 110 is a unitary lightguide meaning that the lightguide is a single layer construction and does not include any interfaces, such as a sharp interface, a gradient interface, or a distributed interface, within the interior of the lightguide. Furthermore, unitary lightguide 110 is made of the same material composition meaning that different locations within the lightguide have the same material composition. Although the unitary lightguides disclosed herein have the same material composition, the index of refraction of the lightguide need not be uniform throughout the lightguide. For example, a unitary lightguide can have a gradient refractive index, such as a linear gradient refractive index, along the thickness direction of the unitary lightguide.

Lightguide 110 is a flexible lightguide meaning that the lightguide is sufficiently thin so that it is capable of bending to a small radius of curvature without damage. For example, lightguide 110 can be bent, without damage, to a radius of curvature down to about 100 mm, or about 50 mm, or about 30 mm, or about 15 mm, or about 10 mm, or about 5 mm, or about 3 mm.

In some cases, the average thickness of lightguide 110 is in a range from about 50 microns to about 800 microns, or from about 100 microns to about 600 microns, or from about 100 microns to about 500 microns. In some cases, the average thickness of lightguide 110 is less than about 800 microns near structured input side 120 and less than about 700 microns near distal side 122, or less than about 700 microns near structured input side 120 and less than about 600 microns near distal side 122, or less than about 600 microns near structured input side 120 and less than about 500 microns near distal side 122, or less than about 500 microns near structured input side 120 and less than about 400 microns near distal side 122, or less than about 400 microns near structured input side 120 and less than about 300 microns near distal side 122. In some cases, the average thickness of lightguide 110 is about 350 microns near structured input side 120 and about 250 microns near distal side 122.

Structured input side 120 includes a first pattern 170 that includes smaller features 172 superimposed on a second pattern 175 that includes larger features 177. Larger features 177 effectively distribute light within the lightguide by scattering input lights 182 and 186 in the xy-plane as they enter the lightguide. Smaller features 172 provide some light scattering in the vertical (thickness or z-direction) direction and some additional lateral (xy-plane) scattering.

In some cases, the first pattern is an irregular pattern and the second pattern is a regular pattern. For example, in some cases, first pattern 170 is a substantially random pattern and second pattern 175 is substantially a periodic pattern or substantially a wave-like pattern. In some cases, a periodic or wave-like second pattern 175 is a linear periodic or wave-like pattern meaning that larger features 177 extend linearly along the thickness dimension (z-axis) and have a lateral (along the y-axis) periodic or wave-like profile. For example, FIG. 2 illustrates linear features 177 of second pattern 175 extending linearly along the z- or thickness direction of lightguide 110.

In some cases, such as when the first pattern is substantially a random pattern, smaller features 172 have an average size that is less than about 30 microns, or less than about 25 microns, or less than about 15 microns, or less than about 10 microns, or less than about 5 microns.

In some cases, such as when second pattern 175 is a substantially periodic or wave-like pattern, larger features 177 have an average size, such as an average lateral size, that is less than about 200 microns, or less than about 150 microns, or less than about 100 microns. In some cases, such as when second pattern 175 is a substantially periodic pattern, the pitch or period of the second pattern is less than about 500 microns, or less than about 400 microns, or less than about 300 microns, such as, for example, 250 or 240 microns.

In the exemplary light source 100, larger features 177 include a plurality of depressions 177A and a plurality of protrusions 177B. In general, larger features 177 can have a plurality of protrusions and/or a plurality of depressions, such as, for example, a plurality of linear protrusions and/or a plurality of linear depressions extending along the thickness direction (z-direction) of the lightguide. For example, FIG. 3 is a schematic top-view of a portion of a light source 300 that includes a structured input side 320 that includes a first pattern 370 that includes smaller features 372 superimposed on a second pattern 375 that includes larger features 377. Light source 300 is similar to light source 100 except that larger features 377 include a plurality of depressions 377A, but do not include any protrusions.

In some cases, one or more of second or distal side 122, third side 124 and fourth side 126 can be structured or smooth. In some cases, one or more of second or distal side 122, third side 124 and fourth side 126 can be light reflecting by, for example, being coated with a metal such as silver or aluminum, or by, for example, being laminated to a light reflecting surface or film.

In the exemplary light source 100, first pattern 170 covers substantially the entire structured input side 120 and second pattern 175 covers the areas that are proximate lamps 180 and 184. In general, each of the first and second patterns can cover a portion of or substantially the entire structured input side 120.

First lamp 180 defines a first light incidence area 183 on structured input side 120 that is directly illuminated by emitted light 182, and second lamp 184 defines a second light incidence area 185 on structured input side 120 that is directly illuminated by emitted light 186. In some cases, second pattern 175 covers a portion of the structured input side that lies within, or is disposed inside, the light incidence areas, but not a portion of the structured input side that lies, or is disposed, outside the light incidence areas. For example, in the exemplary light source 100, second pattern 175 covers at least portions of light incidence areas 183 and 185, but not a non-radiance area 189 that is disposed between the two light incidence areas. Area 189 is not directly illuminated by lights 182 and 186, although it may be eventually illuminated by light that enters the light guide from lamps 180 and 184.

Structured top surface 115 includes a first region 130 that includes a plurality of discrete light extractors 142 for extracting light that propagates within flexible unitary lightguide 110 by total internal reflection and a second region 140 that includes a taper portion 160 for directing light from structured input side 120 to first region 130, and a plateau portion 150 that is disposed between structured input side 120 and taper portion 160.

Taper portion 160 of second region 140 tapers thinner toward first region 130. In particular, taper portion 160 has a first thickness $h_1$ at a first end 141 of the taper portion and a second thickness $h_2 < h_1$ at a second end 142 of the taper portion, where first end 141 is closer to structured input side 120 and second end 142 is farther from the structured input side. In general, taper portion can have any type taper that may be desirable in an application. For example, taper portion 160 can include one or more linear tapers or one or more nonlinear portions, or one or more combinations of linear and nonlinear portions. Exemplary nonlinear taper portions includes exponential tapers, parabolic tapers, polynomial, such as quadratic, tapers, or one or more combinations of such tapers. For example, FIG. 4 is a schematic side-view of a portion of a lightguide 410 that is similar to taper portion 160 except that taper portion 460 includes a parabolic portion 462 and a linear portion 464.

In the exemplary light source 100, taper portion 160 includes a single linear taper that tapers linearly from a larger thickness $h_1$ to a smaller thickness $h_2$. Taper portion 160 has a taper height $h_t = h_1 - h_2$, a taper length $l_t$, and a taper angle $\theta_t$. In some cases, the taper angle $\theta_t$ is in a range from about 1 degree to about 15 degrees, or from about 1 degree to about 10 degrees, or from about 1 degree to about 7 degrees, or from about 1 degree to about 5 degrees. In some cases, the taper angle $\theta_t$ is less than about 15 degrees, or less than about 10 degrees, or less than about 7 degrees, or less than about 5 degrees. In some cases, such as when the index of refraction of lightguide 100 is about 1.5, $\theta_t$ is about 4 degrees, $l_t$ is about $1.7h_1$, and $h_t$ is about $0.12h_1$.

Plateau portion 150 has a substantially constant height although, in some cases, the top surface 151 of the plateau portion can be structured. In some cases, second region 140 may not include a plateau portion. In such cases, first end 141 can be at or near structured input side 120.

Plurality of discrete light extractors 142 include exemplary discrete light extractors 142A-142E. The light extractors extract light out of lightguide 110 by frustrating total internal reflection (TIR). For example, light extractor 142B extracts light ray 131 that would otherwise undergo TIR, as extracted light ray 131B. In particular, light ray 131 propagates along and within the lightguide by TIR and is incident on top surface 115 at a location 132 which is also the location of light extractor 142B. In the absence of light extractor 142B, light ray 131 undergoes TIR at location 132 resulting in a totally internally reflected light ray 131A. The presence of light extractor 142B frustrates TIR resulting in at least a portion of light ray 131 exiting lightguide 110 as extracted light ray 131B. In such cases, a portion of light ray 131 may still be reflected internally at location 132, but the reflection is a Fresnel reflection and not a total internal reflection.

In general, plurality of light extractors 142 can include convex structures forming protrusions from top surface 115 and/or concave structures forming depressions in the top surface, where the structures can have any shape or profile that may be desirable in an application. For example, light extractor 142A is a protrusion or a protruding light extractor and light extractor 142C is a depression or a depressed light extractor. Exemplary shapes or profiles include hemispherical, pyramidal, prismatic, trapezoidal, sinusoidal, elliptical, or any other shape with linear or nonlinear facets or sides that may be suitable in providing, for example, a desired light extraction pattern.

Figure 6:
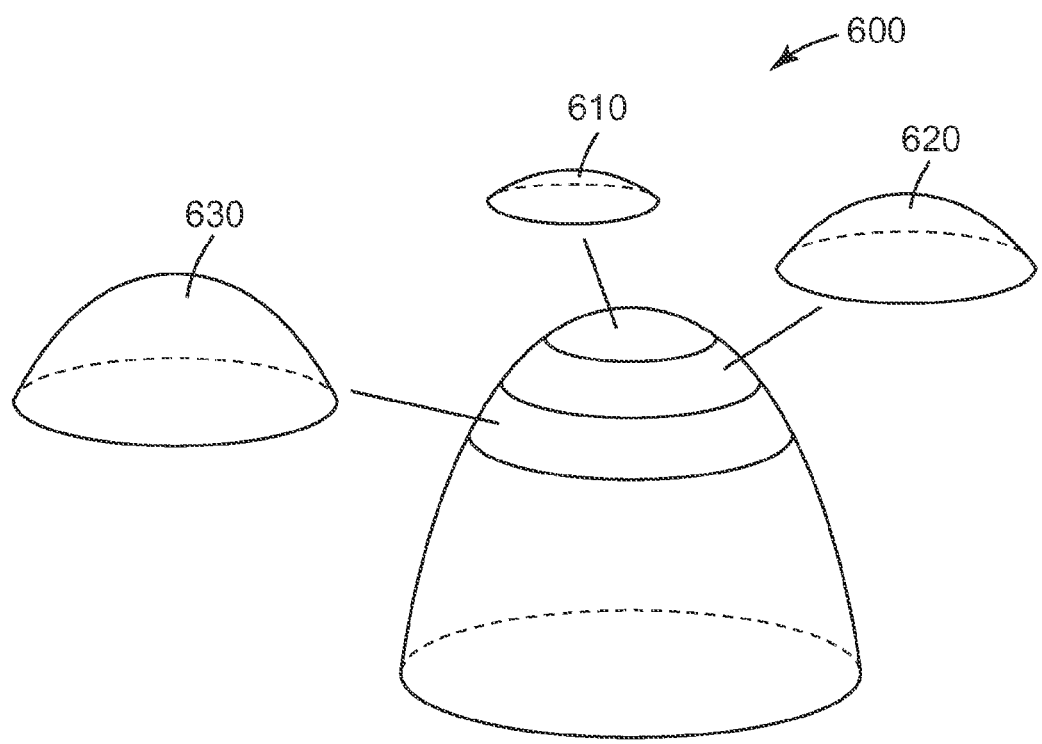
FIG. 6 is a schematic view of a three-dimensional body.

In some cases, each discrete light extractor in plurality of light extractors 142 is a portion of the same three-dimensional body. For example, each discrete light extractor in plurality of light extractors 142 can be a portion of a three-dimensional body 600 shown schematically in FIG. 6, where body 600 can be, for example, a portion of an ellipsoid. For example, some of the light extractors can be portion 610 of body 600, some other light extractors can be portion 620 of body 600, and still some other light extractors can be portion 630 of body 600. Exemplary three-dimensional bodies include spheres, spheroids, egg-shape or ovoids, and pyramids.

In general, the base of a light extractor 142 has a size $a_1$ along the length of the lightguide (x-direction) and a size $b_1$ along the width of the lightguide (y-direction), where in general, the length of the lightguide is in a direction that is normal to structured input side 120 and the width of the lightguide is in a direction that is parallel to the structured input side. In some cases, $a_1$ and $b_1$ are substantially equal. In such cases, the base can, for example, be a circle or a square. In some cases, each of $a_1$ and $b_1$ is less than about 500 microns, or less than about 400 microns, or less than about 300 microns, or less than about 200 microns. In some cases, $a_1$ is less than about 300 microns and $b_1$ is less than about 250 microns, or $a_1$ is less than about 250 microns and $b_1$ is less than about 200 microns, or $a_1$ is less than about 200 microns and $b_1$ is less than about 150 microns, or $a_1$ is less than about 150 microns and $b_1$ is less than about 100 microns, or $a_1$ is less than about 120 microns and $b_1$ is less than about 100 microns.

In some cases, the maximum height $C_1$ of a protruding light extractor or the maximum depth $C_2$ of a depressed light extractor is less than about 200 microns, or less than about 150 microns, or less than about 100 microns, or less than about 80 microns, or less than about 60 microns, or less than about 40 microns, or less than about 20 microns.

Figure 5:
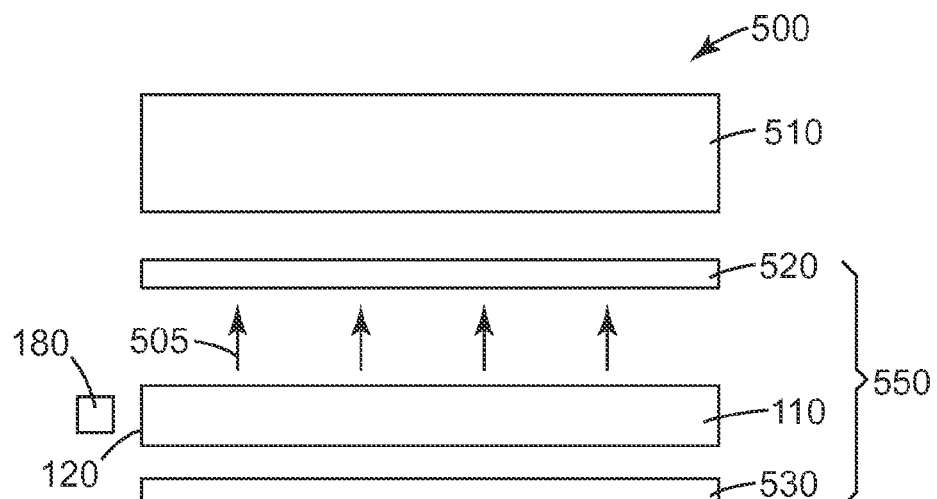
FIG. 5 is a schematic side-view of a display system.

In general, plurality of light extractors 142 can form any arrangement that may be desirable in an application. For example, in some cases, plurality of light extractors 142 can form a periodic array having a first period $P_1$ along the length (x-direction) of the flexible unitary lightguide and a second period $P_2$ along the width (y-direction) of the flexible unitary lightguide. In some cases, the first period $P_1$ and/or the second period $P_2$ is such that substantially no visible moiré fringes occur when flexible unitary lightguide 110 is used as a backlight in a pixelated display, such as a pixelated display that includes a pixelated liquid crystal panel. For example, FIG. 5 is a schematic side-view of a pixelated display system 500 that includes a pixelated liquid crystal panel 510 and a backlight 550 for illuminating panel 510. Backlight 550 includes one or more optional light management layers 520, light source 100 emitting light 505 for illuminating panel 510, and a back reflector 530 for reflecting light that is incident on the back reflector toward panel 510. Light source 100 includes one or more lamps 180 disposed proximate structured input side 120 of flexible unitary lightguide 110. Light management layer 520 can include, for example, one or more light redirecting films, one or more retarder films, one or more light polarizing films, and one or more diffuser films.

Back reflector 530 can be any type reflector that may be desirable and/or practical in an application. For example, the back reflector can be a specular reflector, a semi-specular or semi-diffuse reflector, or a diffuse reflector, such as those disclosed in International Patent Application No. PCT/US 2008/064115, filed May 19, 2008, claiming priority from Provisional U.S. Patent Application No. 60/939,085, filed May 20, 2007, both incorporated herein by reference in their entirety. For example, the back reflector can be an aluminized film or a multi-layer polymeric reflective film, such as an enhanced specular reflector (ESR) film (available from 3M Company, St. Paul, Minn.). As another example, back reflector 530 can be a diffuse reflector having a white appearance.

In some cases, each of the first period $P_1$ and the second period $P_2$ is in a range from about 5 microns to about 2000 microns, or from about 10 microns to about 1000 microns, or from about 10 microns to about 500 microns, or from about 10 microns to about 300 microns, or from about 10 microns to about 200 microns, or from about 10 microns to about 100 microns. In some cases, $P_2$ is less than $P_1$. In some cases, $P_2$ is greater than $P_1$. In some cases, $P_2$ is equal to $P_1$.

In some cases, a characteristic of a discrete light extractor, such as light extractor 142E, that is disposed closer to structured input side 120 can be different, such as smaller, than the same characteristic of a discrete light extractor, such as light extractor 142A, that is disposed farther from the structured input side. For example, the maximum height of light extractor 142E can be smaller than the maximum height of light extractor 142A. As another example, the area of the base of light extractor 142E can be smaller than the area of the base of light extractor 142A. As yet another example, the size of light extractor 142E can be smaller than the size of light extractor 142A.

In general, neighboring light extractors are separated by a separation 144. For example, neighboring light extractors 142A and 142B are separated by a separation 144A. As another example, 144B is the separation between neighboring light extractors 142D and 142E. In general, two neighboring light extractors can have any separation that may be desirable in an application. In some cases, the separation between two neighboring light extractors can be in a range from about 0.5 microns to about 1000 microns, or from about 1 micron to about 700 microns, or from about 1 micron to about 500 microns, or from about 1 micron to about 300 microns, or from about 1 micron to about 200 microns, or from about 1 micron to about 100 microns.

In some cases, plurality of light extractors 142 forms an array that includes a plurality of rows of light extractors oriented along the length of the lightguide (x-direction) and a plurality of columns oriented along the width of the lightguide. For example, in FIG. 1A, plurality of light extractors 142 forms rows and columns of light extractors, such as rows 146A and 146B of light extractors, and columns 147A and 147B of light extractors. In some cases, light extractors disposed in a column have the same size, or are substantially identical. For example, light extractor 142E is the same as, or substantially identical to, light extractor 142F.

In some cases, light extractors disposed in a row are not identical. For example, for a given row of light extractors, a characteristic of a discrete light extractor that is closer to structured input side 120 can be different, such as smaller, than the same characteristic of a discrete light extractor that is farther from the structured input side. For example, the size of light extractor 142E can be smaller than the size of light extractor 142A.

Figure 7:
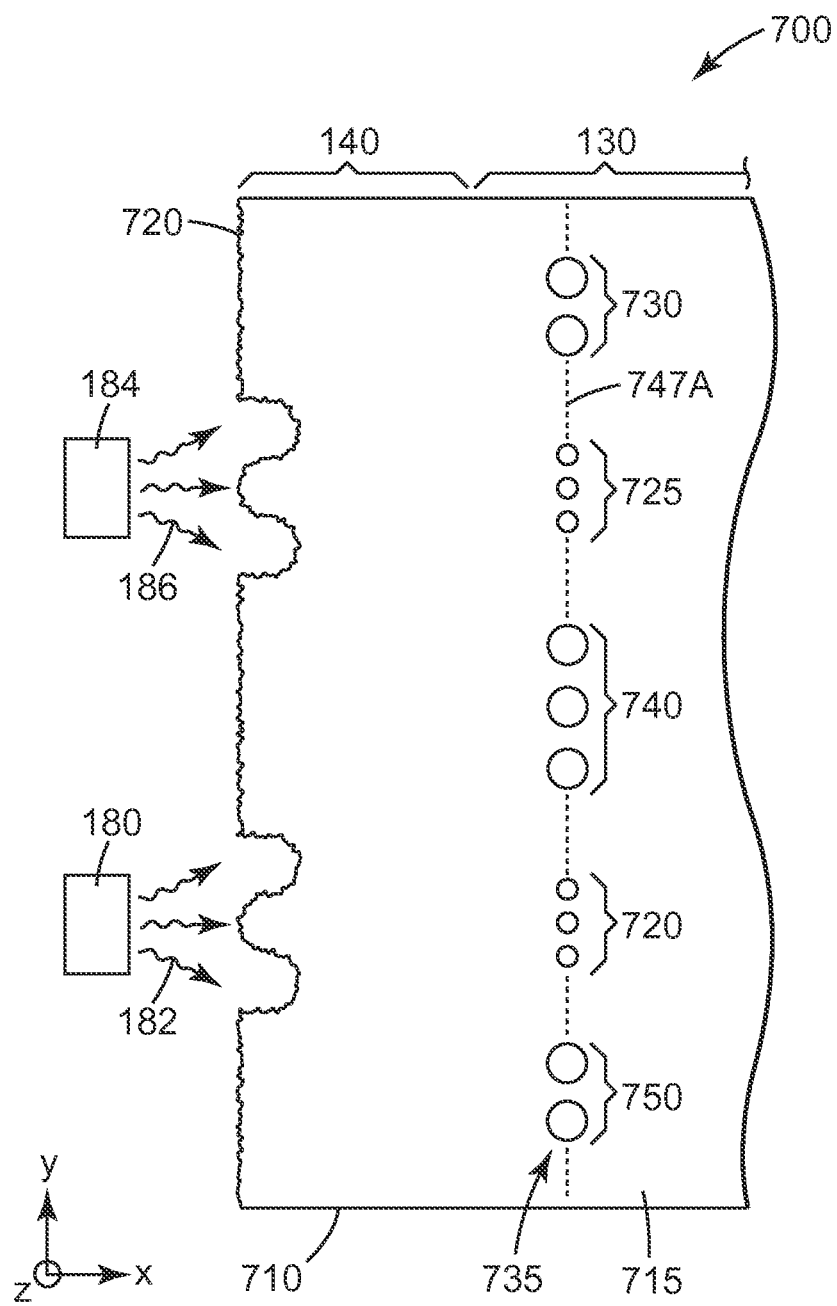
FIG. 7 is a schematic top-view of a portion of a light source.

In some cases, for a given column of light extractors, a light extractor that is closer to a lamp is smaller than a light extractor that is farther from the lamp. For example, FIG. 7 is a schematic top-view of a portion of a light source 700 that includes a flexible unitary lightguide 710, first lamp 180 emitting light 182, and second lamp 184 emitting light 186. Lightguide 710 includes a structured top surface 715 that includes a column 747A of a plurality of light extractors 735 where the direction of the column is substantially parallel to a structured input side 720 of the lightguide. For the light extractors in column 747A, some light extractors that are closer to a lamp are smaller than some light extractors that are farther from the lamp. For example, light extractors 725 and 720 that are closer to lamps 180 and 184 are smaller than light extractors 740 that are farther from the two lamps. As another example, light extractors 730 that are farther from lamp 184 are larger than light extractors 725 that are closer to lamp 184. As another example, light extractors 750 that are farther from lamp 180 are larger than light extractors 720 that are closer to lamp 180.

The exemplary light source 100 includes two discrete light sources 180 and 184 disposed along structured input side 120 of flexible unitary lightguide 110. In general, the light sources disclosed herein can have one or more discrete light sources disposed along a structured input side of the lightguides.

Lamps 180 and 184 can be any type lamps that may be desirable in an application. For example, lamp 180 can be a cold cathode fluorescent lamp (CCFL) or a light emitting diode (LED). Lightguide 110 can be made of any lightguide material that may be desirable in an application. Exemplary lightguide materials include glass or polymeric materials such as cyclic olefin copolymers (COC), polyester (e.g., polyethylene naphthalate (PEN)), polyethylene terephthalate (PET), polyacrylate, polymethylmethacrylate (PMMA), polycarbonate (PC), polymethylpentene, styrene acrylonitrile, or any other suitable polymeric material.

The lightguides disclosed herein can be fabricated using the method outlined in reference to FIGS. 8A-8F. The method provides flexibility and control in producing a flexible unitary lightguide capable of efficiently coupling light from one or more lamps and providing a two-dimensional extended uniform light source.

Figure 8A:
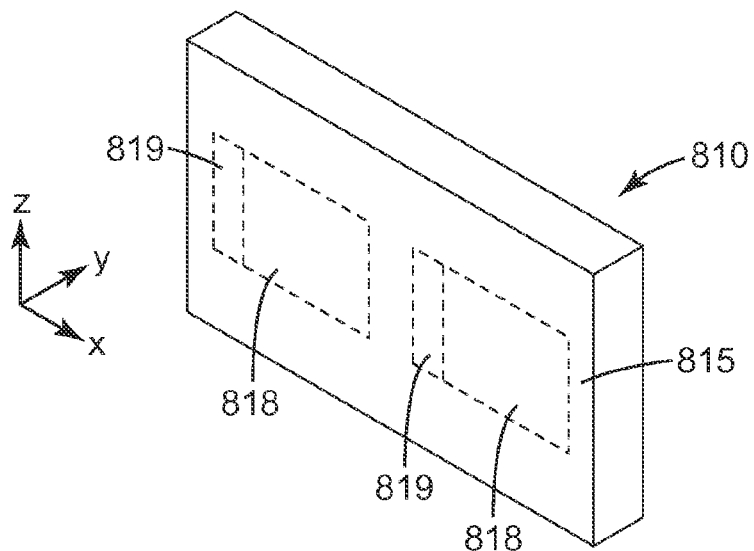
FIGS. 8A-8F are schematic representations of constructions at intermediate stages or steps in a process for fabricating a lightguide.

FIG. 8A is a schematic three-dimensional view of a first tool 810 that includes a top surface 815. The exemplary first tool shown in FIG. 8A is planar. In general, the first tool can have any shape or curvature that may be desirable in an application. For example, first tool 810 can be in the shape of a cylinder. First tool can be made of any material that may be desirable in an application. In some cases, first tool 810 can be made of copper or have a top copper layer.

Figure 8B:
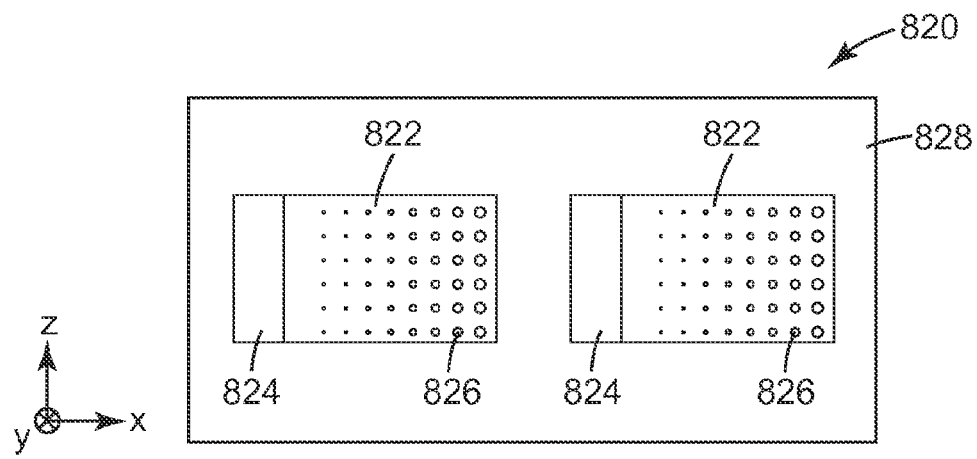

Next, as schematically shown in FIG. 8B, first tool 810 is patterned to form a patterned first tool 820 by patterning a first region 818 of top surface 815 of the first tool using a first patterning method to form a first patterned region 822 in patterned first tool 820, and patterning a second region 819 of top surface 815 of the first tool using a second patterning method different than the first patterning method to form a second patterned region 824 in patterned first tool 820, where second region 819 of first tool 810 is different than first region 818 of the first tool. The patterning results in patterned first tool 820 that includes a structured top surface 828 that includes first patterned regions 822 and second patterned regions 824. In some cases, the first patterning method includes an engraving method and the second patterning method includes a thread cutting method. First patterned region 822 includes a plurality of structures 826. Exemplary thread cutting methods utilize a fast tool servo (FST) as described in, for example, PCT Published Application No. WO 00/48037, and U.S. Pat. Nos. 7,350,442 and 7,328,638, the disclosures of which are incorporated in their entireties herein by reference.

Figure 8C:
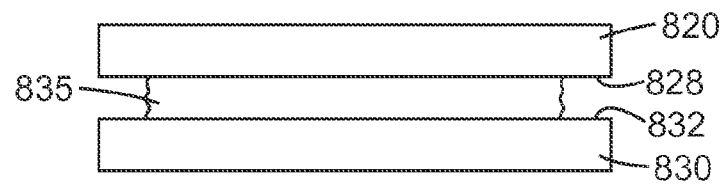
Figure 8D:
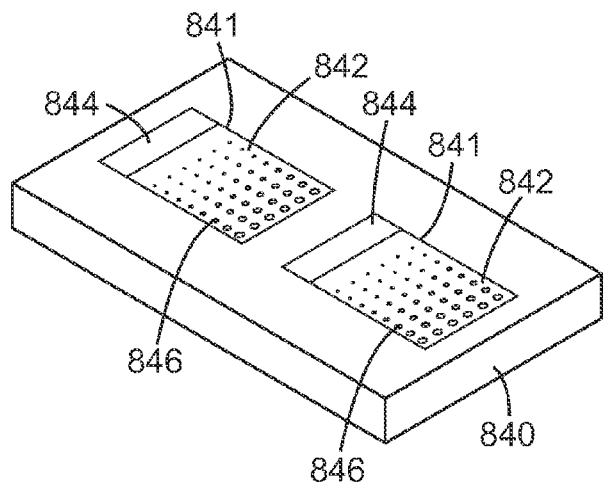

Next, as shown schematically in FIG. 8C, patterned first tool 820 is replicated into a lightguide material 835 that is disposed between structured surface 828 of patterned first tool 820 and a top surface 832 of a second tool 830, where, in some cases, lightguide material 835 physically contacts the outermost surfaces 828 and 832 of respective tools 820 and 830. The replication process results, as shown schematically in FIG. 8D, in a flexible unitary lightguide carrier 840 that includes a lightguide 841 that includes a first replicated region 842 that corresponds to first patterned region 822 of patterned first tool 820 and a second replicated region 844 that corresponds to second patterned region 824 of patterned first tool 820. First replicated region 842 includes a plurality of light extractors 846 that correspond to plurality of structures 826 in first patterned region 822 (FIG. 8B).

Exemplary materials for lightguide material 835 include glass or polymeric materials such as cyclic olefin copolymers (COC), polyester (e.g., polyethylene naphthalate (PEN)), polyethylene terephthalate (PET), polyacrylate, polymethylmethacrylate (PMMA), polycarbonate (PC), polymethylpentene, styrene acrylonitrile, or any other suitable polymeric material.

In some cases, light guide material 835 can be a liquid that is solidified by, for example, heat or radiation, after the replication process and before tools 820 and 830 are removed. In some cases, the replication step is expedited by softening lightguide material 835 by, for example, increasing the temperature of the lightguide material above the glass transition temperature of the lightguide material. In such cases, the temperature of the lightguide material is reduced after the replication process and before tools 820 and 830 are removed.

In some cases, lightguide material 835 can be molten by, for example, sufficiently heating one or both tools 820 and 830. In such cases, the lightguide material is solidified by, for example, cooling tools 820 and 830 after the replication process and before tools 820 and 830 are removed.

Figure 8E:
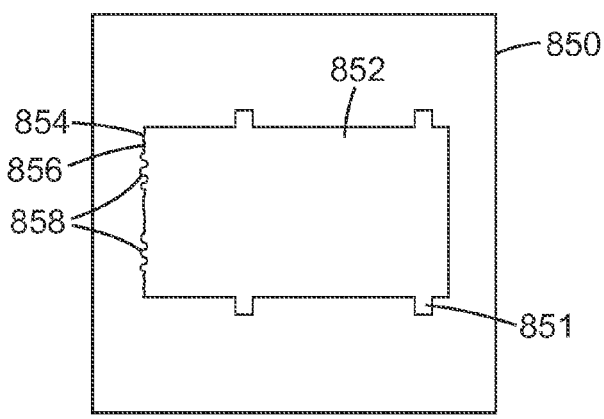

Next, lightguide 841 is cut out of lightguide carrier 840 using a die cutting method that employs a cutter 850, a schematic top-view of which is shown in FIG. 8E. Cutter 850 includes an open area 850 that includes a structured first side 854 and a plurality of recessed regions 851. Structured first side 854 includes a first pattern 856 having smaller features superimposed on a second pattern 858 that includes larger features. Cutter 850 is used to cut along a perimeter of lightguide 841 resulting, as shown schematically in FIG. 8F, in a flexible unitary lightguide 870 that includes a structured input side 881 and a structured top surface 890. Structured input side 881 corresponds to structured first side 854 of open area 852 of cutter 850 and includes a first pattern 882 having smaller features superimposed on a second pattern 884 having larger features.

Structured top surface 890 includes a first region 872 that includes a plurality of light extractors 846 and a second region 844 that includes a taper portion 878. Lightguide 870 also includes a plurality of tabs 892 that correspond to plurality of recessed regions 851 in cutter 850.

The methods of fabrication outlined in reference to FIGS. 8A-8F can be a batch process or a continuous process or a combination of batch and continuous processes. For example, at least portions of the methods disclosed herein can be carried out using a continuous cast and cure process or a continuous extrusion process. In some cases, a continuous process can result in a lightguide carrier 840 that is a flexible unitary web. For example, light carrier 840 can be a continuous web that is at least 10 feet long with a cross-web width of, for example, 2 to 4 feet.

Figure 9:
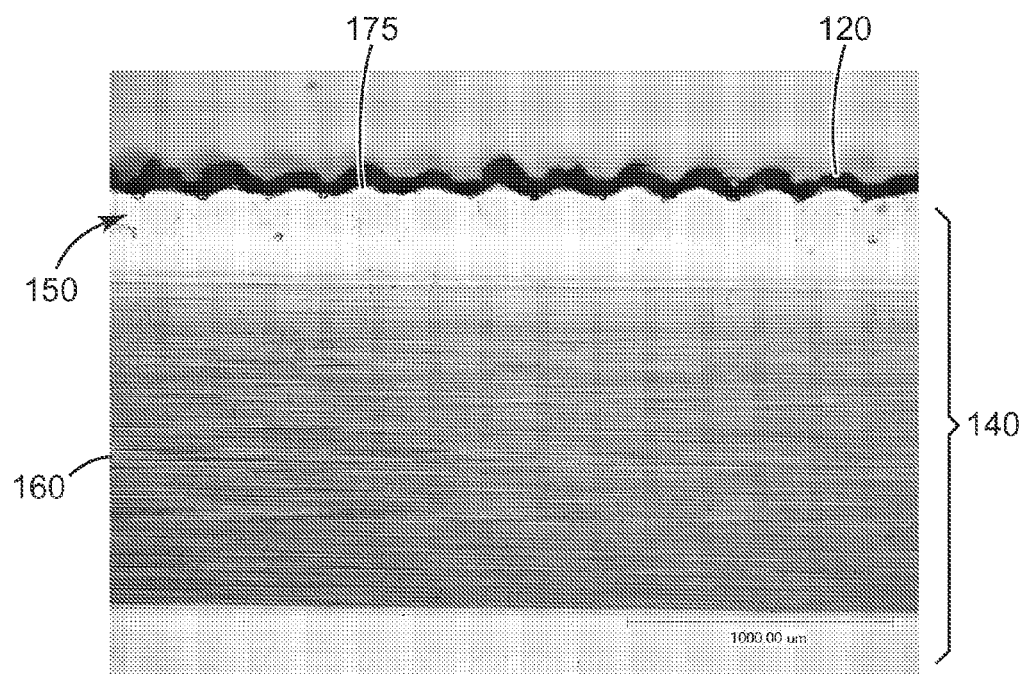
FIG. 9 is an optical micrograph of a structured top surface of a lightguide.
Figure 10:
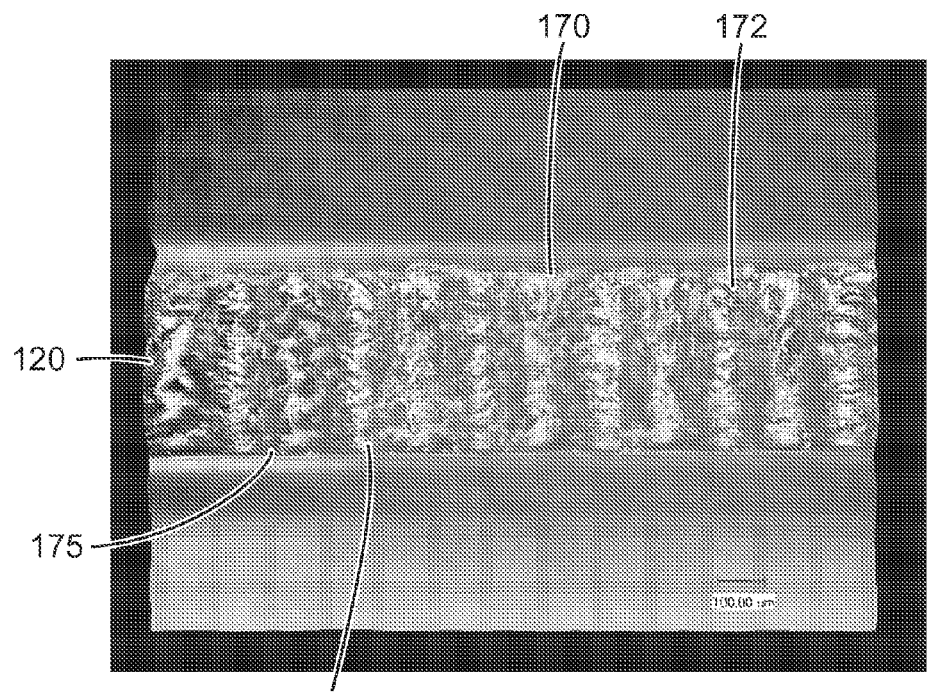
FIG. 10 is an optical micrograph of a structured input side of a lightguide.

FIG. 9 is a top-view optical micrograph of a lightguide, similar to lightguide 110 of FIG. 1A, that was fabricated according to the methods disclosed herein. Using the reference numerals used in FIG. 1A as a guide, the lightguide had a second region 140 and a structured input side 120. Second region 140 included a plateau portion 150 and a taper portion 160. Structured input side 120 included a wave-like second pattern 175. FIG. 10 is a side-view optical micrograph of a lightguide, similar to lightguide 110 of FIG. 2 as a guide, that was fabricated according to the methods disclosed herein. Using the reference numerals used in FIG. 2, the lightguide had a structured input side 120 that included a first pattern 170 having smaller features 172 superimposed on a wave-like second pattern 175 that included larger features 177.

Figure 11:
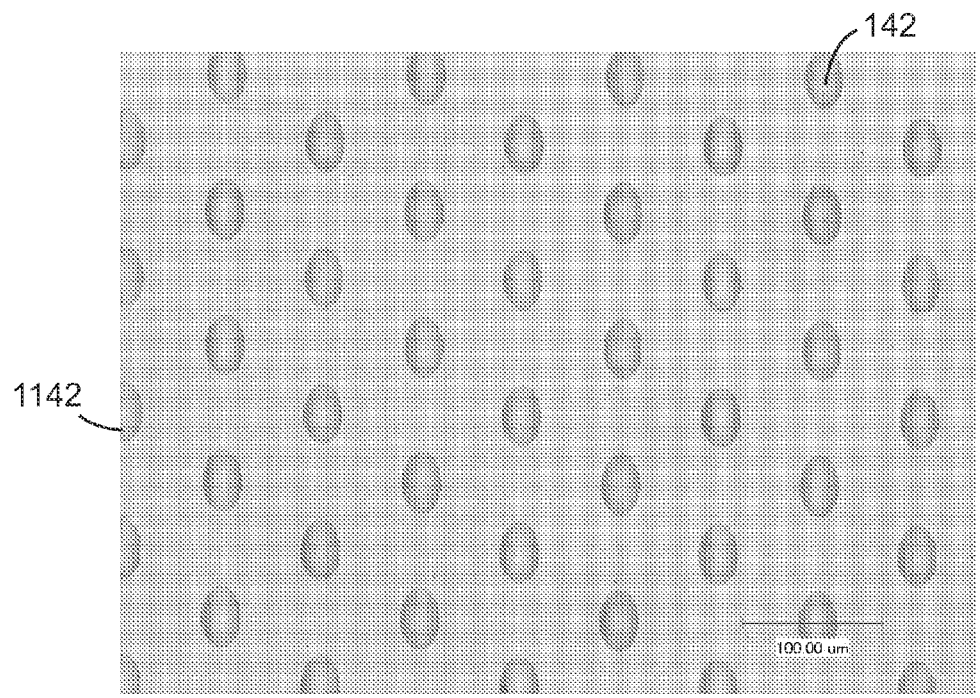
FIG. 11 is an optical micrograph of light extractors of a lightguide near the structured input side of the lightguide.
Figure 12:
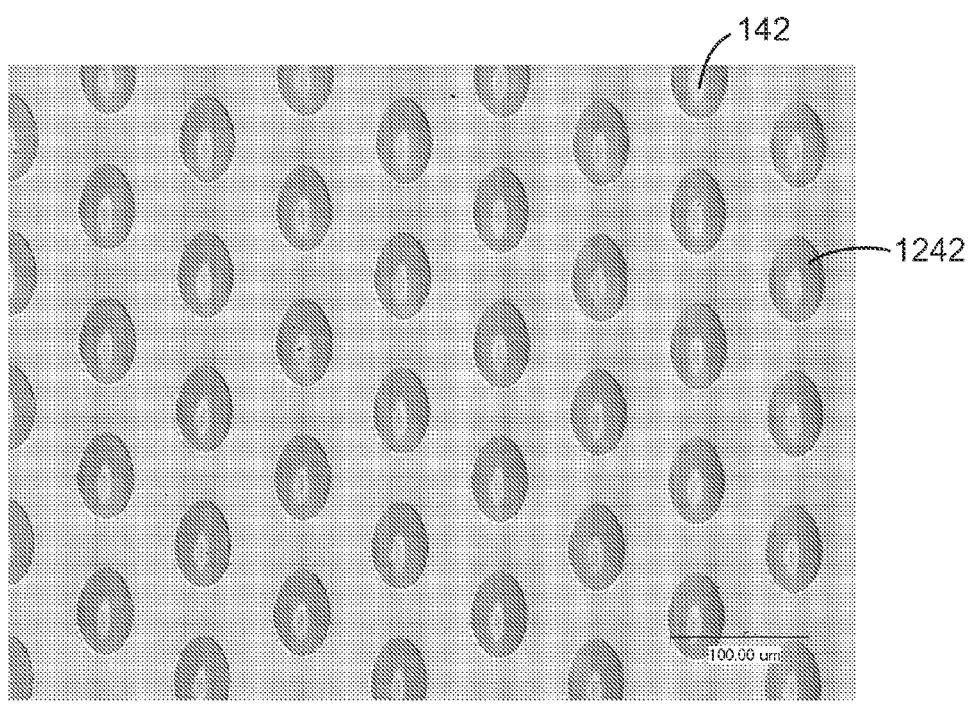
FIG. 12 is an optical micrograph of light extractors of the lightguide shown in FIG. 11 in the middle region of the lightguide.
Figure 13:
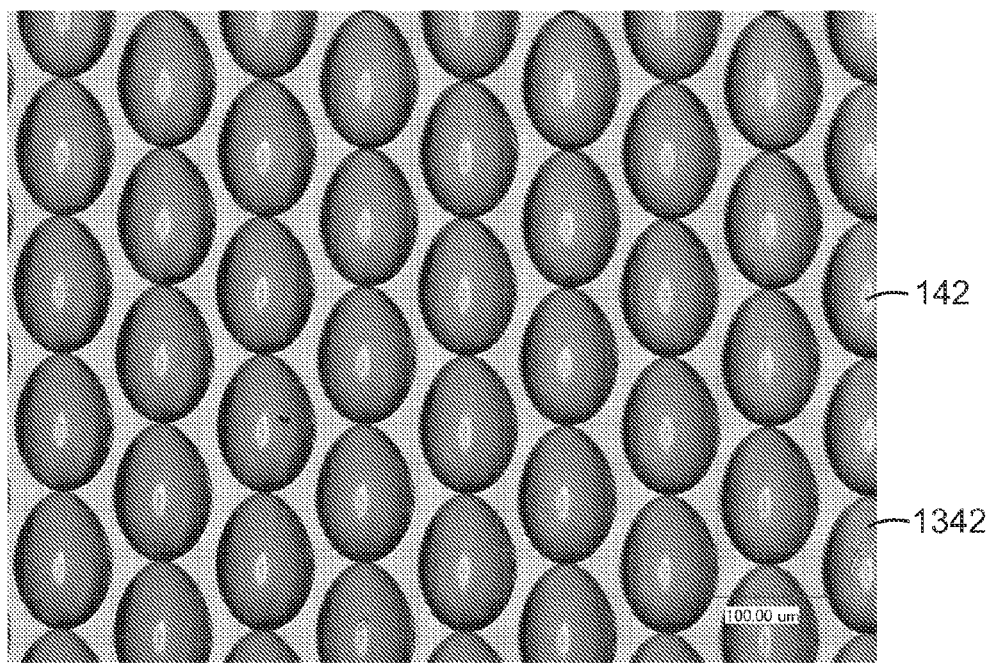
FIG. 13 is an optical micrograph of light extractors of the lightguide shown in FIG. 11 near the distal side of the lightguide.

FIGS. 11-13 show light extractors 142 (FIG. 1A) at different locations of a first region 130 of a lightguide, similar to lightguide 110, that was fabricated according to the methods disclosed herein. In particular, FIG. 11 is a top-view optical micrograph of a plurality of light extractors 1142 near taper portion 160, FIG. 12 is a top-view optical micrograph of a plurality of light extractors 1242 near the middle portion of first region 130, and FIG. 13 is a top-view optical micrograph of a plurality of light extractors 1342 near distal side 122.

Figure 14:
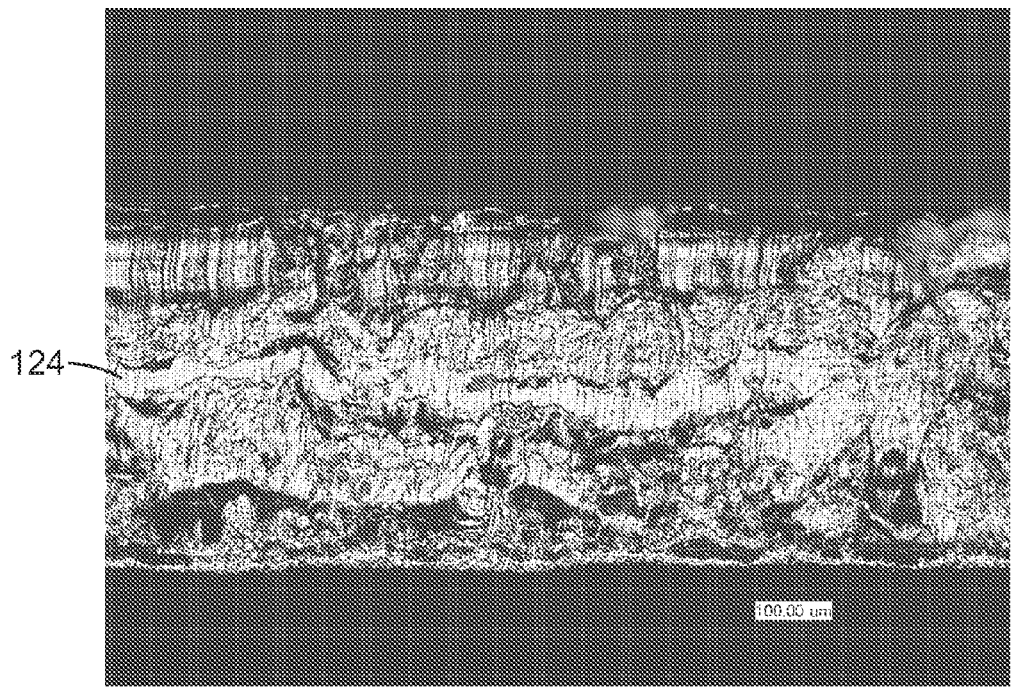
FIG. 14 an optical micrograph of a side of a lightguide.

FIG. 14 is a side-view optical micrograph of a lightguide, similar to lightguide 110 of FIG. 1B, that was fabricated according to the methods disclosed herein. Using the reference numerals used in FIG. 1B as a guide, the lightguide had a structured third side 124.

In some cases, top surface 832 of second tool 830 is smooth. In such cases, the replication process results in a flexible unitary lightguide 870 having a smooth bottom surface 894. In some cases, top surface 832 of second tool is structured. In such cases, the replication process results in a flexible unitary lightguide 870 having a structured bottom surface 894 for preventing, for example, wet out or optical coupling of the lightguide to an adjacent film, such as an adjacent diffuser or brightness enhancement film.

Die cutting is an exemplary cutting method disclosed herein. Lightguide carrier 840 can be cut using other cutting methods to produce a lightguide 870 that includes a structured input side 881. Other exemplary cutting methods include laser cutting methods.

The exemplary cutter 850 includes a structured first side 854 that includes a first pattern 856 having smaller features superimposed on a second pattern 858 having larger features. In some cases, structured first side 854 of cutter 850 may include second pattern 858 but not first pattern 856. In such cases, a first pattern 882 in structured input side 881 of lightguide 870 can be produced during the cutting step by, for example, controlling the cutting speed and/or temperature.

Figure 8F:
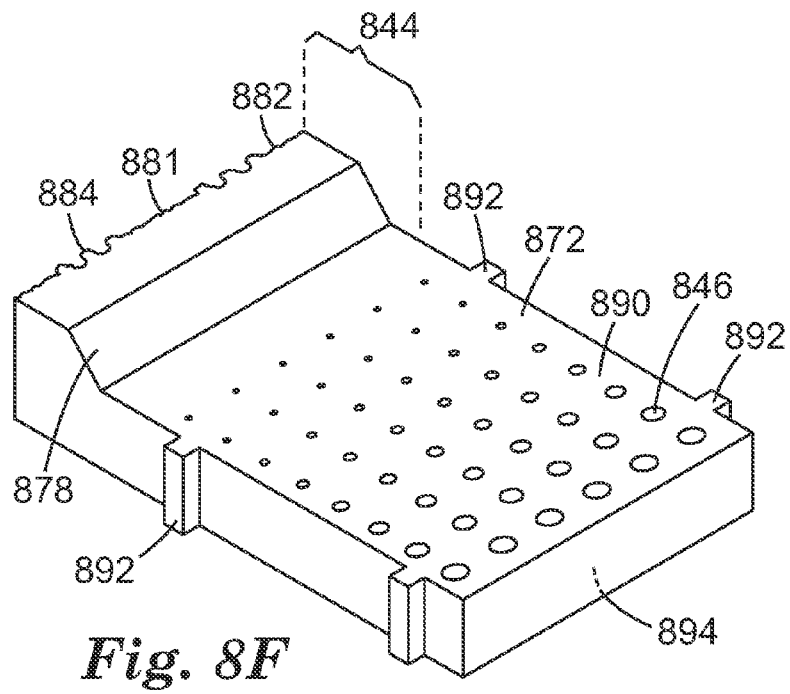

As used herein, terms such as "vertical", "horizontal", "above", "below", "left", "right", "upper" and "lower", "clockwise" and "counter clockwise" and other similar terms, refer to relative positions as shown in the figures. In general, a physical embodiment can have a different orientation, and in that case, the terms are intended to refer to relative positions modified to the actual orientation of the device. For example, even if the image in FIG. 8F is flipped as compared to the orientation in the figure, surface 894 is still considered to be the bottom surface.

All patents, patent applications, and other publications cited above are incorporated by reference into this document as if reproduced in full. While specific examples of the invention are described in detail above to facilitate explanation of various aspects of the invention, it should be understood that the intention is not to limit the invention to the specifics of the examples. Rather, the intention is to cover all modifications, embodiments, and alternatives falling within the spirit and scope of the invention as defined by the appended claims.

What is claimed is:

1. A flexible unitary lightguide comprising:
    a structured input side comprising a first pattern having smaller features superimposed on a second pattern having larger features; and
    a structured top surface comprising:
        a first region comprising a plurality of discrete light extractors for extracting light that propagates within the flexible unitary lightguide by total internal reflection; and
        a second region comprising a taper portion for directing light from the structured input side to the first region, wherein:
        the light extractors form a periodic array having a first period along a length of the flexible unitary lightguide, the first period being such that substantially no visible moiré fringes occur when the flexible unitary lightguide is used as a backlight in a pixelated display.

2. The flexible unitary lightguide of claim 1, wherein the plurality of discrete light extractors comprises a plurality of protrusions.

3. The flexible unitary lightguide of claim 1, wherein the plurality of discrete light extractors comprises a plurality of depressions.

4. The flexible unitary lightguide of claim 1, wherein a size of a base of the extractors in the plurality of discrete light extractors is less than about 200 microns along a length of the lightguide and less than about 150 microns along a width of the lightguide.

5. The flexible unitary lightguide of claim 1, wherein a size of a base of the extractors in the plurality of discrete light extractors is less than about 120 microns along the length of the lightguide and less than about 100 microns along a width of the lightguide.

6. The flexible unitary lightguide of claim 1, wherein a height of the extractors in the plurality of discrete light extractors is less than about 100 microns.

7. The flexible unitary lightguide of claim 1, wherein a height of the extractors in the plurality of discrete light extractors is less than about 60 microns.

8. The flexible unitary lightguide of claim 1, wherein a height of the extractors in the plurality of discrete light extractors is less than about 40 microns.

9. The flexible unitary lightguide of claim 1, wherein a height of the extractors in the plurality of discrete light extractors is less than about 20 microns.

10. The flexible unitary lightguide of claim 1, wherein the first period is in a range from about 10 microns to about 1000 microns.

11. The flexible unitary lightguide of claim 1, wherein the first period is in a range from about 10 microns to about 100 microns.

12. The flexible unitary lightguide of claim 1, wherein a size of a discrete light extractor closer to the structured input side is smaller than a size of a discrete light extractor farther from the structured input side.

13. The flexible unitary lightguide of claim 1, wherein each discrete light extractor is a portion of a same three-dimensional body.

14. The flexible unitary lightguide of claim 13, wherein the three-dimensional body is one of a sphere, a spheroid, an ovoid, and an ellipsoid.

15. The flexible unitary lightguide of claim 1, wherein substantially no visible moiré fringes occur when the flexible unitary lightguide is used as a backlight in a pixelated display that comprises a pixelated liquid crystal panel.

16. The flexible unitary lightguide of claim 1, wherein the first pattern is an irregular pattern and the second pattern is a regular pattern.

17. The flexible unitary lightguide of claim 1, wherein an average size of the features in the first pattern is less than about 30 microns.

18. The flexible unitary lightguide of claim 1, wherein an average size of the features in the second pattern is less than about 200 microns.

19. The flexible unitary lightguide of claim 1, wherein the second pattern comprises a wave-like pattern.

20. The flexible unitary lightguide of claim 1, wherein a taper angle of the taper portion is in a range from about 1 degree to about 10 degrees.

21. The flexible unitary lightguide of claim 1, wherein the taper portion comprises a linear taper.

22. The flexible unitary lightguide of claim 1, wherein the second region comprises a plateau portion disposed between the structured input side and the taper portion.

23. A backlight comprising:
the flexible unitary lightguide of claim 1; and
one or more lamps disposed proximate the structured input side of the flexible unitary lightguide.

24. The flexible unitary lightguide of claim 23, wherein the one or more lamps define one or more light incidence regions on the structured input side, the second pattern covering a first portion of the structured input side disposed inside the one or more incidence regions, but not a second portion of the structured input side disposed outside the one or more incidence regions.

25. A flexible unitary lightguide comprising:
a structured input side comprising a first pattern having smaller features superimposed on a second pattern having larger features; and
a structured top surface comprising:
 a first region comprising a plurality of discrete light extractors for extracting light that propagates within the flexible unitary lightguide by total internal reflection, each discrete light extractor being a portion of a same three-dimensional body; and
 a second region comprising a taper portion tapering thinner toward the first region, wherein:
a size of a discrete light extractor closer to the structured input side is smaller than a size of a discrete light extractor farther from the structured input side.

26. The flexible unitary lightguide of claim 25, wherein the light extractors in the plurality of discrete light extractors form a periodic array having a first period along a length of the flexible unitary lightguide, the first period being such that substantially no visible moiré fringes occur when the flexible unitary lightguide is used as a backlight in a pixelated display.

27. The flexible unitary lightguide of claim 25, wherein the three-dimensional body is one of a sphere, a spheroid, an ovoid, and an ellipsoid.

\* \* \* \* \*